(12) United States Patent
Angelo et al.

(10) Patent No.: US 11,277,261 B2
(45) Date of Patent: Mar. 15, 2022

(54) BLOCKCHAIN-BASED TRACKING OF PROGRAM CHANGES

(71) Applicant: NETIQ CORPORATION, Houston, TX (US)

(72) Inventors: Michael F. Angelo, Spring, TX (US); Lloyd Leon Burch, Payson, UT (US); Baha Masoud, Orem, UT (US)

(73) Assignee: NETIQ CORPORATION, Houston, TX (US)

( * ) Notice: Subject to any disclaimer, the term of this patent is extended or adjusted under 35 U.S.C. 154(b) by 197 days.

(21) Appl. No.: 16/138,268

(22) Filed: Sep. 21, 2018

(65) Prior Publication Data
US 2020/0099513 A1 Mar. 26, 2020

(51) Int. Cl.
| | |
|---|---|
| *H04L 29/06* | (2006.01) |
| *H04L 9/06* | (2006.01) |
| *H04L 9/32* | (2006.01) |
| *G06F 21/16* | (2013.01) |
| *G06F 16/182* | (2019.01) |

(52) U.S. Cl.
CPC .......... *H04L 9/0643* (2013.01); *G06F 16/182* (2019.01); *G06F 21/16* (2013.01); *H04L 9/3247* (2013.01); *H04L 63/12* (2013.01); *H04L 2209/38* (2013.01)

(58) Field of Classification Search
CPC . H04L 9/0643; H04L 9/3247; H04L 2209/38; H04L 63/12; G06F 21/16; G06F 16/182
See application file for complete search history.

(56) References Cited

U.S. PATENT DOCUMENTS

| | | | |
|---|---|---|---|
| 2007/0271461 A1* | 11/2007 | Hardy | G01R 31/31705 713/176 |
| 2012/0096516 A1* | 4/2012 | Sobel | G06F 21/645 726/2 |
| 2017/0140375 A1 | 5/2017 | Kunstel | |
| 2017/0331896 A1 | 11/2017 | Holloway et al. | |
| 2018/0068091 A1 | 3/2018 | Gaidar et al. | |
| 2018/0097635 A1 | 4/2018 | Moses | |
| 2018/0115426 A1 | 4/2018 | Andrade | |
| 2019/0050571 A1* | 2/2019 | Rhee | G06F 21/57 |
| 2019/0065709 A1* | 2/2019 | Salomon | G06F 21/44 |

(Continued)

FOREIGN PATENT DOCUMENTS

| | | |
|---|---|---|
| WO | WO-2017191472 A1 | 7/2017 |
| WO | WO-2018031703 A1 | 2/2018 |

OTHER PUBLICATIONS

Amazon Web Services, What is DevOps? (downloaded Aug. 15, 2018) (8 pages).

(Continued)

*Primary Examiner* — Joseph P Hirl
*Assistant Examiner* — Chi D Nguy

(57) ABSTRACT

In some examples, in response to detecting addition or update of a program component of a program, a system creates a blockchain entry for addition to a blockchain register, generates a hash based on the program component, and adds in the blockchain entry a signed hash produced by encrypting the generated hash. The system publishes the blockchain entry for the blockchain, the signed hash in a blockchain entry useable to detect tampering with the program component.

19 Claims, 7 Drawing Sheets

(56) References Cited

U.S. PATENT DOCUMENTS

| | | | |
|---|---|---|---|
| 2019/0205121 A1* | 7/2019 | Ericson | H04L 9/0643 |
| 2019/0205542 A1* | 7/2019 | Kao | G06Q 10/0635 |
| 2019/0305959 A1* | 10/2019 | Reddy | G06F 8/60 |
| 2020/0073657 A1* | 3/2020 | Robison | G06F 9/44589 |
| 2020/0192638 A1* | 6/2020 | Pezaris | G06F 8/41 |

OTHER PUBLICATIONS

Bridgwater, Adrian, Why You Need to Understand Your Software Supply Chain, Jun. 6, 2018 (4 pages).
Github, Inc., SParts Project: Software Parts Ledger downloaded May 21, 2018 (4 pages).
Wikipedia, Application security last edited Jul. 25, 2018 (4 pages).
Wikipedia, DevOps last edited Aug. 5, 2018 (5 pages).

\* cited by examiner

BLOCKCHAIN-BASED TRACKING OF PROGRAM CHANGES

BACKGROUND

A program can be made up of program components, possibly from a number of different vendors. Some of the program components can include proprietary program code, while other program components include open source program code.

BRIEF DESCRIPTION OF THE DRAWINGS

Some implementations of the present disclosure are described with respect to the following figures.

Figure 1:
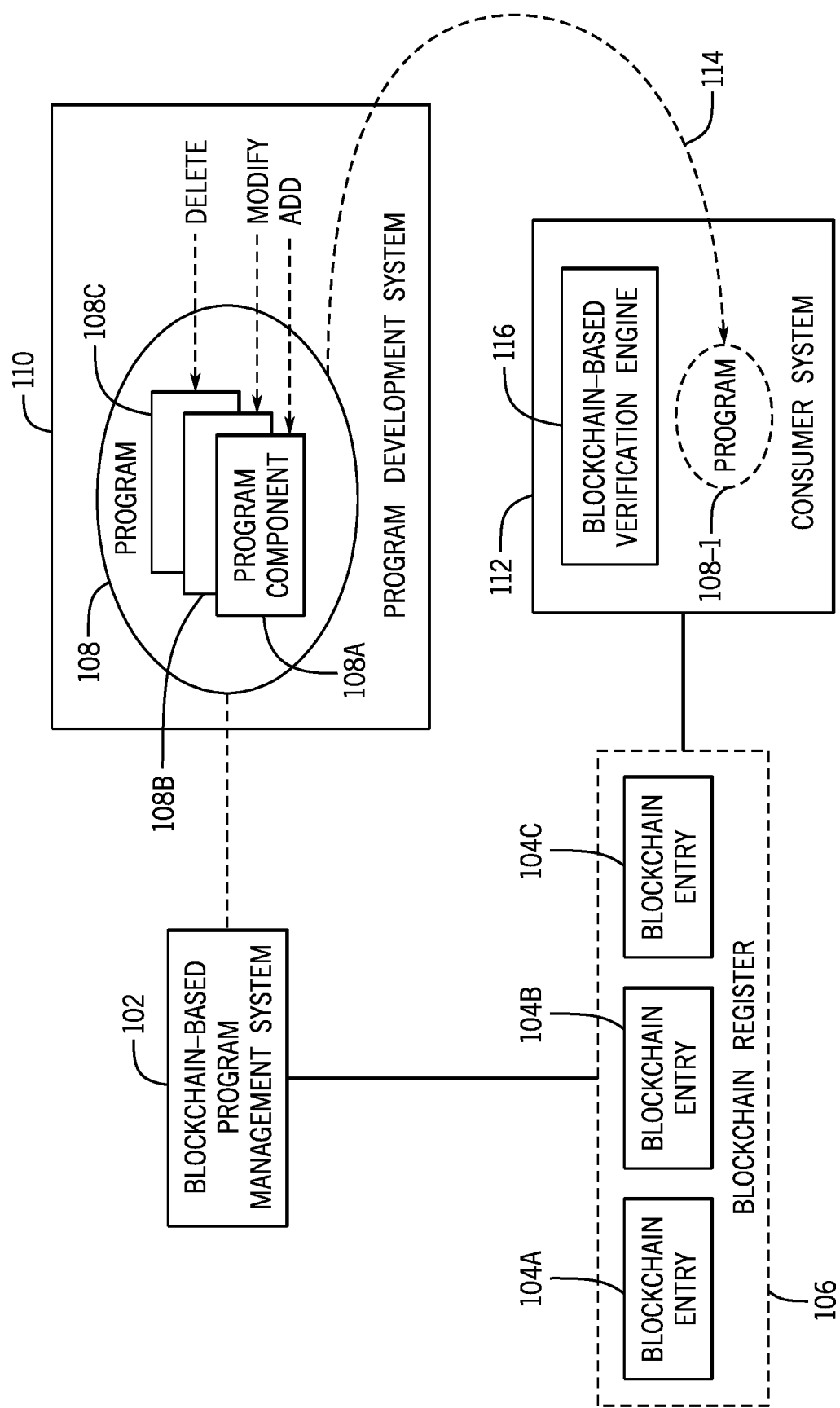
FIG. 1 is a block diagram of an arrangement that includes a blockchain-based program management system, a program development system, and a consumer system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A program can refer to software and/or firmware. A program can include an assembly of multiple program components, where a "program component" can refer to a piece of program code. The program components may be developed at different times and by different programmers, possibly from multiple different companies. Some program components may include proprietary program code developed by an enterprise, while other program components may include open source program code that is publicly available for anyone to use.

Program supply chain analysis and management relates to understanding the components of a program and determining the authenticity and integrity of the components. Traditionally, a trusted entity is relied upon to assure the validity and trustworthiness of a program. For example, this trusted entity may be a single company (the company that is selling the program or otherwise in charge of distributing the program) or a single author (e.g., a programmer that developed the program). Recipients of the program may incorrectly assume that the trusted entity has validated and verified each of the components of the program, which may come from different sources. The trusted entity may not have performed validation or verification, or may have performed inadequate validation or verification, or may simply have failed to detect an issue with validation or verification, of certain components of the program.

The user of the program may not have a way of performing an independent assessment of whether all of the components of the program can be trusted. Certain program components, such as open source components, may have been created or modified by unknown or untrusted authors, which can render the entire program untrustworthy.

In accordance with some implementations of the present disclosure, blockchain-based program change tracking techniques or mechanisms are used to allow any entity that wishes to use or otherwise consume a program to ensure that the program components of the program are authentic, are from a trusted source, and/or have not been tampered with (i.e., illicitly modified). If a program component is added to the program, or if a program component of the program is updated (modified or deleted), then a blockchain can be updated by adding a respective record to the blockchain. More specifically, the addition or updating of a program component causes validation and extension of the blockchain. A user or any other entity can confirm the authenticity of the program (based on endorsements of integrity and authorship), including a determination that the program has not been tampered with in an unauthorized manner, by validating the blockchain.

A blockchain refers to a distributed collection of records (referred to as "blocks" or "blockchain entries") that are linked and secured cryptographically in a distributed manner. A blockchain can also refer to a continuous and unbroken ledger of blockchain entries. The blockchain entries of the blockchain can be distributed across a large number of computing devices.

Each blockchain entry can include various information, including program component data for a newly created or updated program component, and other information. A blockchain (which forms a distributed transaction ledger) records transactions (which in some implementations include the addition or updating of program components) among multiple entities in a verifiable and permanent way. Once a blockchain entry is created and the data of the blockchain entry is recorded, the blockchain entry cannot be altered without alteration of subsequent blockchain entries.

Multiple entities can see the transaction ledger, but because of the decentralized nature of the distributed collection of blockchain entries, the blockchain is protected against hacking or corruption by a malicious entity. The validation of each blockchain entry added to the blockchain is performed by a respective computing device by applying hashing and a digital signature. If the validation fails, then that computing device drops the blockchain entry from the blockchain (or does not add the blockchain entry to the blockchain).

FIG. 1 is a block diagram of an example arrangement that includes a blockchain-based program management system 102 according to some examples of the present disclosure. The blockchain-based program management system 102 is able to perform blockchain-based program change tracking of a program 108, by extending a blockchain (as represented by a blockchain register 106) in response to the addition of a program component to the program 108, or in response to an update (modification or deletion) of a program component of the program 108.

The blockchain register 106 can also be referred to as a program "bill of materials" (BOM) that contains information relating to components of the program, and that maintains a history of changes (addition of program components, modification of program components, deletion of program components) made to the program 108.

The blockchain-based program management system 102 can create blockchain entries 104 in a blockchain register 106 in response to detecting changes of the program 108 that is being developed by the program development system 110. The program development system 110 can present a visual interface (or multiple visual interfaces) at which a programmer (or multiple programmers) can make changes to the program 108 at respective device(s) of the programmer(s).

As depicted in FIG. 1, the program 108 includes program components 108A, 108B, and 108C, as examples. Although just three program components are shown in FIG. 1, it is noted that in other examples, the program 108 can include a smaller number of program components or a larger number of program components.

In the example of FIG. 1, it is assumed that the program component 108A has been added, the program component 108B has been modified, and the program component 108C has been deleted. Each of these actions (adding a program component, modifying a program component, and deleting a program component) constitutes a change that is made to the program 108, which triggers the blockchain-based program management system 102 to create respective blockchain entries corresponding to the changes.

For example, the blockchain-based program management system 102 creates the blockchain entry 104A in response to the addition of the program component 108A, creates the blockchain entry 104B in response to the modification of the program component 1046, and creates the blockchain entry 104C responsive to the deletion of the program component 108C.

It is noted that the blockchain register 106 including the blockchain entries can be distributed across a distributed arrangement of storage devices. The blockchain register 106 is a data repository that includes the blockchain entries of the blockchain represented by the blockchain register 106. Also, the blockchain-based program management system 102 can include machine-readable instructions that are distributed across a number of computing devices.

The program development system 110 also can include a number of computing devices used by respective different entities (e.g., programmers) to make respective changes to the program 108. For example, a first entity can add the program component 108A, a second entity can modify the program component 108B, and a third entity can delete the program component 108C.

In other examples, the same entity can perform all of the adding, modifying, and deleting tasks.

FIG. 1 also shows a consumer system 112 that is associated with a consumer that desires to use the program 108. The program 108 can be downloaded (at 114) into the consumer system 112 (as a program 108-1). The consumer system 112 can include just one computing device, or a number of computing devices. A consumer can refer to a single user or an organization that can include multiple users. The downloaded program 108-1 may be used by a single user or by multiple different users, such as those of an organization.

Before using the program 108, a blockchain-based verification engine 116 of the consumer system 112 can perform a confirmation of the authenticity of the program based on endorsements of integrity and authorship (discussed further below) in the blockchain entries of the blockchain register 106.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

If the blockchain-based verification engine 116 can confirm the authenticity and integrity of the program 108 (as provided by the program development system 110), then the program 108 can be downloaded to the consumer system 112 and executed. However, if the blockchain-based verification engine 116 is unable to confirm the authenticity and integrity of the program 108 based on the blockchain register 106, then downloading of the program 108 from the program development system 110 to the consumer system 112 is prevented by the blockchain-based verification engine 116.

In alternative examples, the blockchain-based verification engine 116 can confirm the authenticity and integrity of the downloaded program 108-1 after it has been downloaded to the consumer system 112. If the blockchain-based verification engine 116 can confirm the authenticity and integrity of the downloaded program 108-1, then the consumer system 112 is allowed to execute the program 108-1. However, if the blockchain-based verification engine 116 is unable to confirm the authenticity and integrity of the program 108-1, then execution of the program 108-1 at the consumer system 112 is prevented by the blockchain-based verification engine 116.

An endorsement of integrity refers to an endorsement of the content of a program component of a program (such as the program 108). An endorsement of authorship refers to an endorsement of an identity of an entity (e.g., a user) that performed the action that changed the program 108, where the action can include adding a program component or updating a program component (where updating can include modifying the program component or deleting the program component).

Figure 2A:
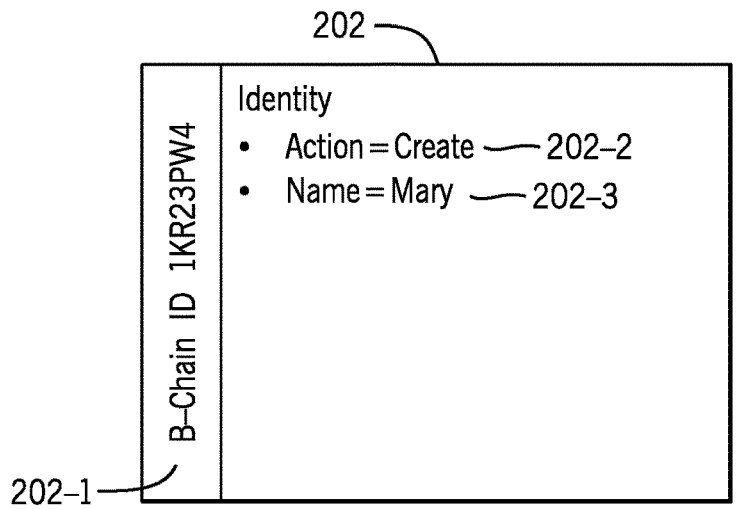
FIGS. 2A-2E illustrate various blockchain entries, according to some examples.
Figure 2B:
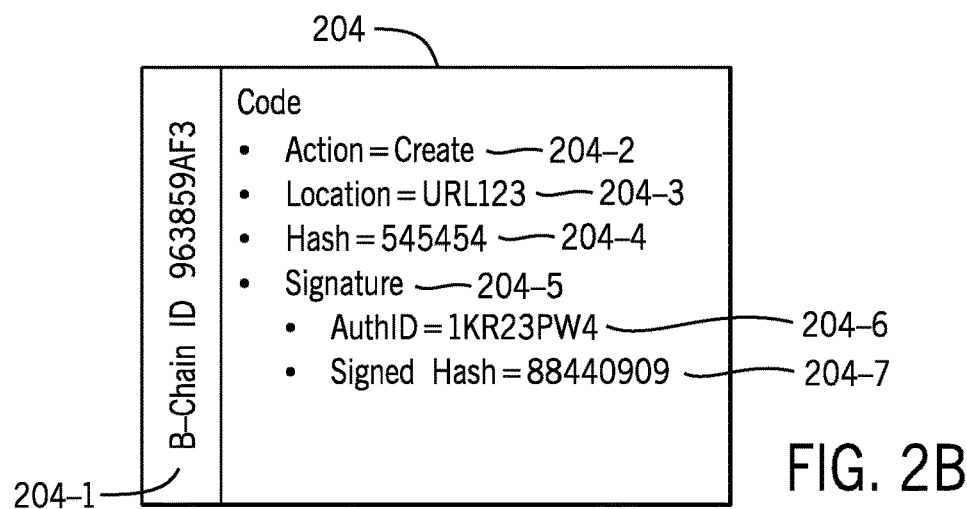

FIGS. 2A and 2B show example blockchain entries 202 and 204, respectively, that are created by the blockchain-based program management system 102 (FIG. 1) in response to the addition of a program component to a program. The blockchain entry 202 is an identity blockchain entry relating to the identity of an author that performed the program change, which in this example is the addition of a program component. The blockchain entry 204 is a code blockchain entry that relates to the content of the program component that is the subject of the change of the program.

In other examples, instead of using separate identity and code blockchain entries, a single blockchain entry that relates to an identity of an author that performed the program change, and to the content of the code of the program component can be used.

The identity blockchain entry 202 has a blockchain identifier (ID) 202-1. A blockchain ID refers to any information that can uniquely identify a respective blockchain entry.

In the example of FIG. 2A, the identity blockchain entry 202 includes an Action field 202-2 that can be set to one of several different values to indicate the respective actions performed with respect to the program. In the example, the Action field 202-2 has a value "Create" to indicate that the action performed is the addition of a program component to the program. Other possible values for the Action field 202-2 include "Modify" to indicate a modification of a program component, and "Delete" to indicate a deletion of a program component.

The identity blockchain entry 202 also includes a Name field 202-3 that is set to a value representing the name of the entity that performed the action identified in the Action field 202-2. The name can be a full name, an alias, an initial, or any other identifier of the author.

In other examples, the identity blockchain entry 202 can further include other information, such as an email address, contact information, a full name of the author, reputation information of the author that indicates a reputation of the author (e.g., the author is experienced, the author is an expert in a specific programming language, etc.), location information of a public key, and so forth.

The code blockchain entry 204 includes a blockchain ID 204-1 and various other example fields. The code blockchain entry 204 includes an Action field 204-2 (which is set to the "Create" value to indicate that the program component represented by the code blockchain entry 204 was created), a Location field 204-3 that is set to a value to identify a location of the program component that has been created (the location can be expressed as a uniform resource locator or URL or can be expressed using another representation of a storage location where the program component is stored), and a Hash field 204-4 that is set to a hash value generated by applying a hash function on a portion of the program component (and possibly other values discussed further below in connection with FIG. 4). The "portion" of the program component can include the entire program component or some subset of the program component.

The code blockchain entry 204 further includes a Signature field 204-5 that has various sub-fields, including an author identifier (Auth ID) sub-field 204-6 and a Signed Hash sub-field 204-7. The Auth ID sub-field 204-6 can be set to a value that relates to the author of the action performed on the program component. In the example of FIG. 2B, the Auth ID field 204-6 is set to the blockchain ID 202-1 of the identity blockchain entry 202 that corresponds to the identity of the author.

The Signed Hash field 204-7 is set to a signed hash value computed based on encrypting the hash value in the Hash field 204-4 using a private key, such as the private key of the author.

The code blockchain entry 204 can also include other information, such as endorsement information (e.g., the program language, the date and time of the change of the program component, a type of the program component, etc.).

Figure 2C:
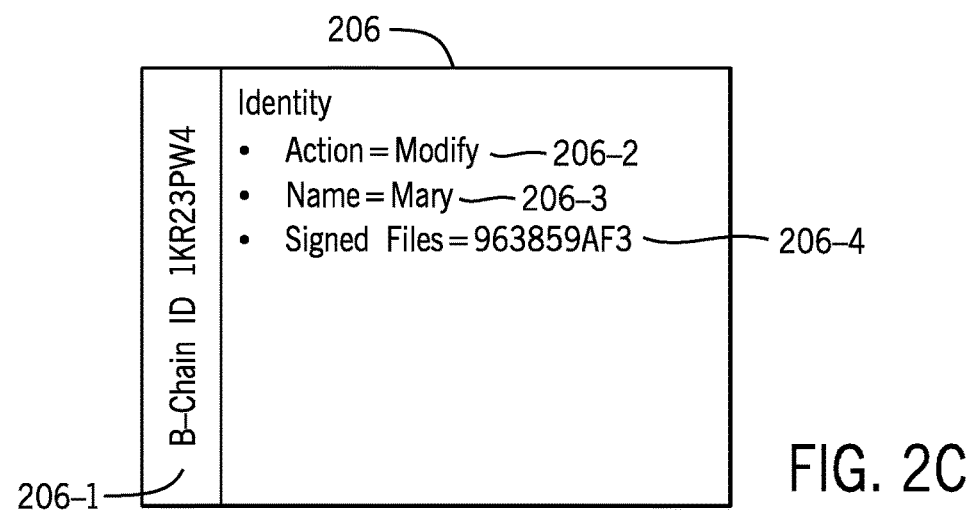

Subsequent to the creation of the program component by the author identified by the identity blockchain entry 202, the same author ("Mary" in the example) can modify the program component. In response to the modification of the program component, an identity blockchain entry 206 as shown in FIG. 2C is created by the blockchain-based program management system 102. The identity blockchain entry 206 has a blockchain ID 206-1, an Action field 206-2 set to a "Modify" value, a Name field 206-3 set to a value that identifies the author "Mary", and a Signed Files field 206-4 that is set to a value associated with the program component that is modified. In the example of FIG. 2C, the Signed Files field 206-4 is set to the blockchain identifier 204-1 of the code blockchain entry 204, which represents the code that has been modified.

Although not shown, another code blockchain entry corresponding to the modification of the program code by the author "Mary" can be created. Such a code blockchain entry is similar to the code blockchain entry 204, except that the Action field is set to the value "Modify."

Figure 2D:
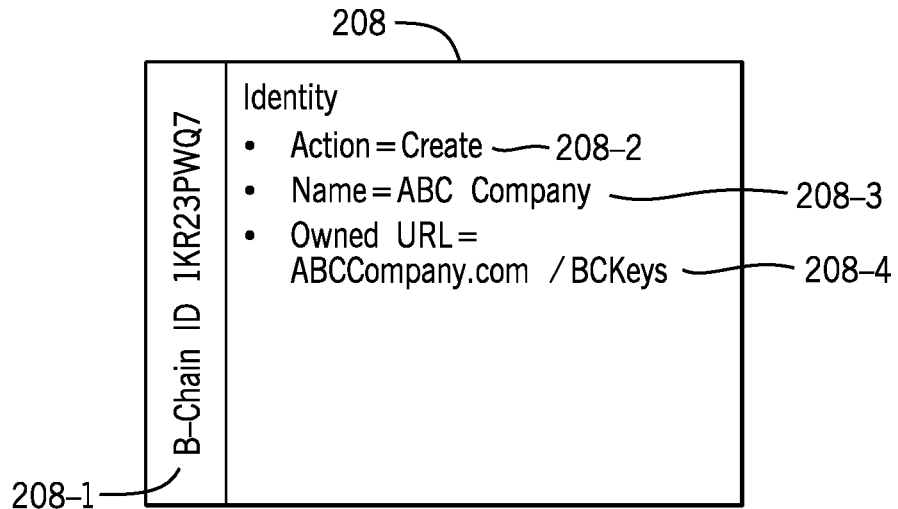
Figure 2E:
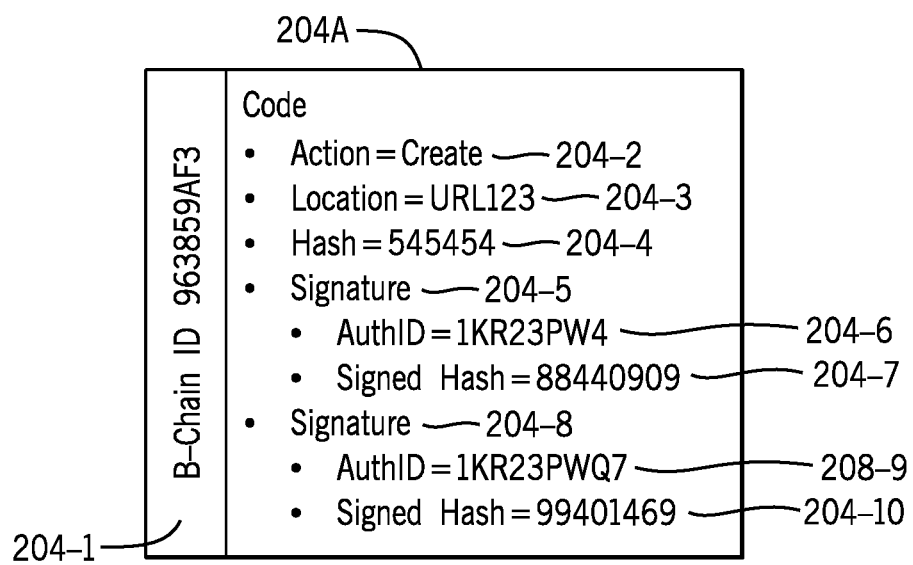

FIGS. 2D and 2E illustrate additional blockchain entries 208 and 204A, respectively, based on endorsement by an organization that receives the program component from the author "Mary." Endorsement by the organization of the program component created by the author means that the organization has confirmed the authenticity and integrity of the program component. For example, "Mary" may be an employee, a contractor, a seller or distributor of the program component, etc., for the organization.

After the author "Mary" has created the program component, the program component can be provided to an organization "ABC Company" for endorsement. In response to endorsement by the organization, the identity blockchain entry 208 is created, which has a blockchain ID 208-1, an Action field 208-2 set to the "Create" value, a Name field 208-3 set to value "ABC Company," and an Owned URL field 208-4 set to a value that identifies the location (e.g., a URL) where a public key is kept. The public key at the location indicated by the Owned URL field 208-4 can be used by anyone to verify the authenticity of the program component.

Endorsement by the organization also causes extension of the code blockchain entry 204 (FIG. 2B) to produce an extended code blockchain entry 204A shown in FIG. 2E. The extended code blockchain entry 204A has the blockchain ID 204-1 and the same fields 204-2 to 204-7 and sub-fields 204-2 and 204-6 as the blockchain entry 204 of FIG. 2B.

In addition, the extended code blockchain entry 204A has been extended to add another signature field 204-8 that has an author identifier (Auth ID) field 204-9 set to the blockchain ID 208-1 of the identity blockchain entry 208 of FIG. 2D, and a Signed Hash field 204-10 set to a value that based on encrypting the hash value of the Hash field 204-4 using the private key of the ABC Company.

Figure 3:
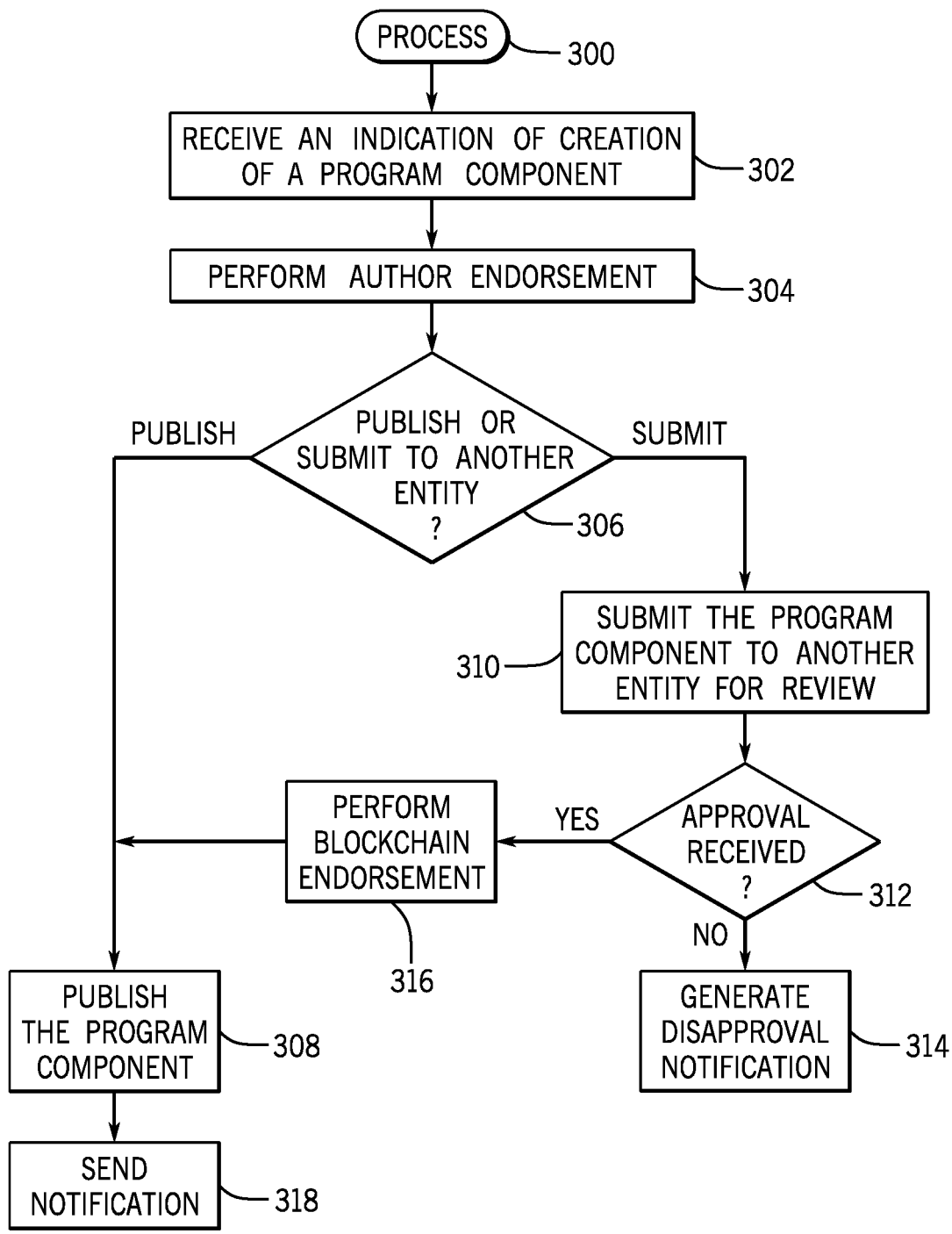
FIG. 3 is a flow diagram of a process according to some examples.

FIG. 3 is a flow diagram of a process 300 according to some examples. The process 300 of FIG. 3 can be performed by the blockchain-based program management system 102 of FIG. 1, for example. The process 300 receives (at 302) an indication of creation of a program component. Although the example of FIG. 3 refers to a process relating to creation of a program component, a similar procedure may be followed for other program changes, such as modification of a program component or deletion of a program component.

The process 300 further performs an author endorsement (at 304) in response to endorsement of the program code by the author. The author endorsement procedure is depicted in further detail in FIG. 4.

Next, the process 300 determines (at 306) whether the program component is to be published or to be submitted to another entity (such as an organization) for endorsement and publication. If the decision is to publish the program component, then the process 300 publishes (at 308) the program component. Publishing the program component includes making the program component available (also referred to as "propagating") to other entities (e.g., such as posting the program component to a website or other location that is accessible by other entities), distributing the program component for inclusion in a program that is being sold or otherwise distributed to a consumer, providing a notification of availability of the program component, and so forth.

In addition, publishing the program component (at 308) involves extending the blockchain register 106 (FIG. 1) with an additional blockchain entry (or multiple blockchain entries), such as an identity blockchain entry and a code blockchain entry, corresponding to the creation of the program component.

If the process determines (at 306) that the program component is to be submitted to another entity for endorsement and publication, then the process 300 submits (at 310) the program component to the other entity for review for publication. The other entity can verify the identity of the author and the integrity of the program component (e.g., the program component is bug or defect free, the program component does not include malware, etc.).

The process 300 determines (at 312) whether an approval has been received from the other entity. If not, then the process 300 generates (at 314) a disapproval notification to indicate that the other entity has not approved the program component, such as due to the other entity determining that the program component cannot be trusted.

However, if the process 300 receives approval of the program component, then the process 300 can perform a blockchain endorsement (at 316), such as by adding the organization identify blockchain entry 208 of FIG. 2D and extending the code blockchain entry 204A as shown in FIG. 2E.

The author endorsement (at 304) is a personal endorsement, while the blockchain endorsement is an approval endorsement by an entity separate from the author.

After the blockchain endorsement has been performed (at 316), the process can publish (at 308) the program component. Next, the process 300 can send a notification (at 318) to the author of a result of the endorsement process, which can include (1) publication of the program component without endorsement by another entity, (2) publication of the program component after endorsement by another entity, or (3) notification of disapproval by the other entity.

A publisher does not remove or modify an author endorsement, but rather, adds to the author endorsement. There can be multiple publishers with multiple endorsements (whether connected or not connected), which may be reflected in respective blockchain entries.

Figure 4:
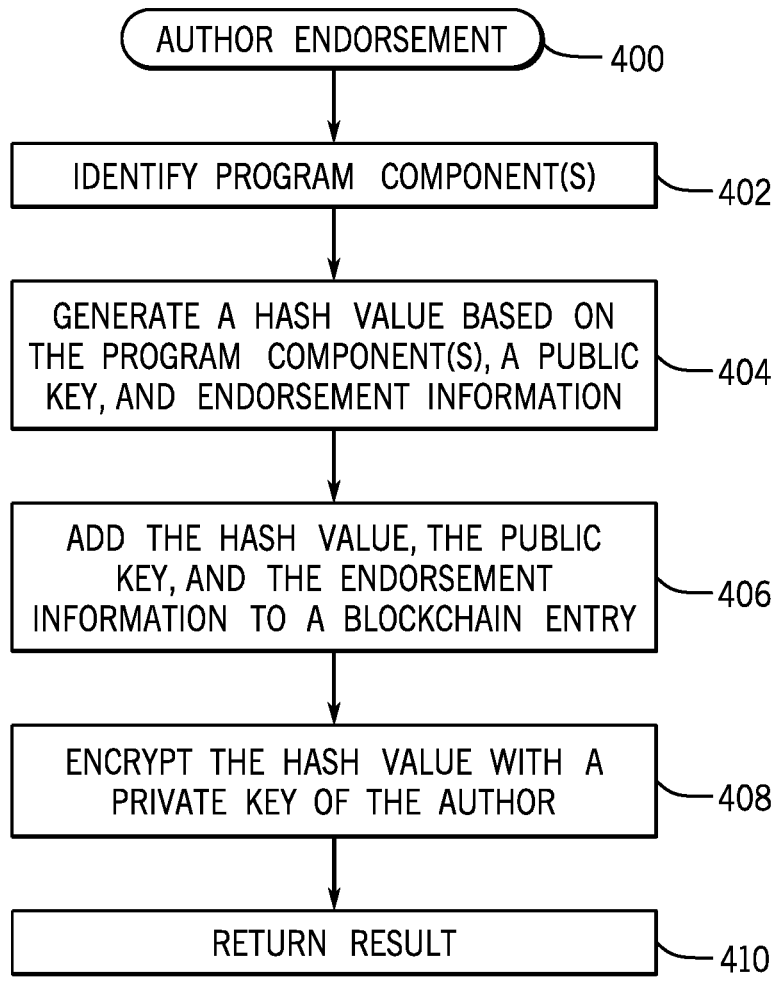
FIG. 4 is a flow diagram of an author endorsement process according to some examples.

FIG. 4 is a flow diagram of an author endorsement process 400 (e.g., the author endorsement 304 of FIG. 3) according to some examples. The process 400 identifies (at 402) the program component (or multiple program components) that is (are) to be endorsed. The process 400 generates (at 404) a hash value based on applying a hash function on the program component(s) (either the entirety of the program component(s) or a part of the program component(s)), a public key, and endorsement information. Endorsement information can include information that the author wishes to add, including, as examples, the program language, the date and time of the change of the program component, the type of the program component, and so forth.

The hash value, the public key, and the endorsement information are added (at 406) to a blockchain entry (e.g., the code blockchain entry 204 of FIG. 2B). The process 400 encrypts (at 408) the hash value with a private key (of the author) that is associated with the public key.

The process 400 then returns (at 410) the result of the author endorsement, which includes the updated blockchain entry.

As noted above, the blockchain-based verification engine 116 (FIG. 1) of the consumer system 112 can use blockchain entries of the blockchain register 106 to verify the authenticity and integrity of the program components of the program 108 or 108-1.

For example, in the code blockchain entry 204 of FIG. 2B, the Signed Hash field 204-7 is set to a signed hash value computed based on encrypting the hash value in the Hash field 204-4 using a private key, such as the private key of the author. The blockchain-based verification engine 116 can decrypt the signed hash value using the public key corresponding to the private key. The decrypting of the signed hash produces the hash value. The blockchain-based verification engine 116 can then calculate a hash value based on the program component at the location specified by the Location field 204-3 and possibly other information (such as the public key and the endorsement information). The blockchain-based verification engine 116 compares the calculated hash value to the decrypted hash value, and if they match, the integrity of the program component has been verified.

The blockchain-based verification engine 116 can determine an action performed by an author for the program component based on action information included in the code blockchain entry 204.

In addition, the blockchain-based verification engine 116 can use an identity (e.g., in the Auth ID field 204-6) included in the code blockchain entry 204 to find an identity blockchain entry (e.g., 202 in FIG. 2A). The blockchain-based verification engine 116 can determine an author that added or updated the program component using an identity of the author included in the identity blockchain entry 202.

The identity blockchain entry 202 can determine a quality of the program component based on the identity of the author. Also, if the identity blockchain entry 202 includes reputation information of the author, then the blockchain-based verification engine 116 can determine a quality of the program component based on the identity of the author.

With multiple blockchain entries corresponding to different changes of the program, the authenticity and integrity of the program components corresponding to the changes can be verified using the blockchain register 106. Also, note that the blockchain entries of the blockchain register 106 do not merely track transactions corresponding to program changes, but also tracks the authorship and content (technical correctness) of the program components of the program.

Figure 5:
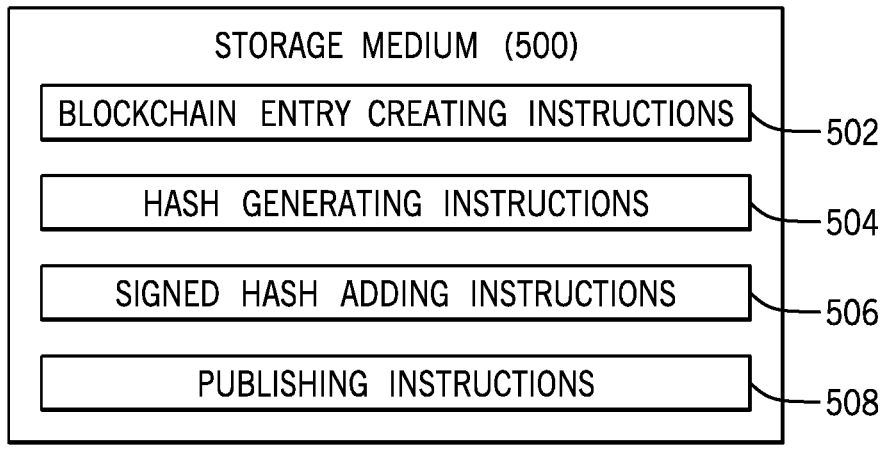
FIG. 5 is a block diagram of a storage medium storing machine-readable instructions according to some examples.

FIG. 5 is a block diagram of a non-transitory machine-readable or computer-readable storage medium 500 that stores machine-readable instructions that upon execution by a system perform respective tasks. The machine-readable instructions include instructions for blockchain-based program change tracking, and include instructions 502, 504, and 506 that perform tasks in response to detecting addition or update of a program component of a program. The instructions 502 include blockchain entry creating instructions to create a blockchain entry for addition to a blockchain register. The instructions 504 include hash generating instructions to generate a hash based on the program component (and possibly other information). The instructions 506 include signed hash adding instructions to add in the blockchain entry a signed hash produced by encrypting the generated hash.

The machine-readable instructions stored in the storage medium 500 further include blockchain entry publishing instructions 508 to publish the blockchain entry for a blockchain, the signed hash in the blockchain entry useable to detect tampering with the program component.

The machine-readable instructions can further include instructions to include in the blockchain entry information of a public key (e.g., either the public key itself or information identifying a location of the public key) corresponding to the private key, the public key useable to decrypt the signed hash to validate the program component.

Figure 6:
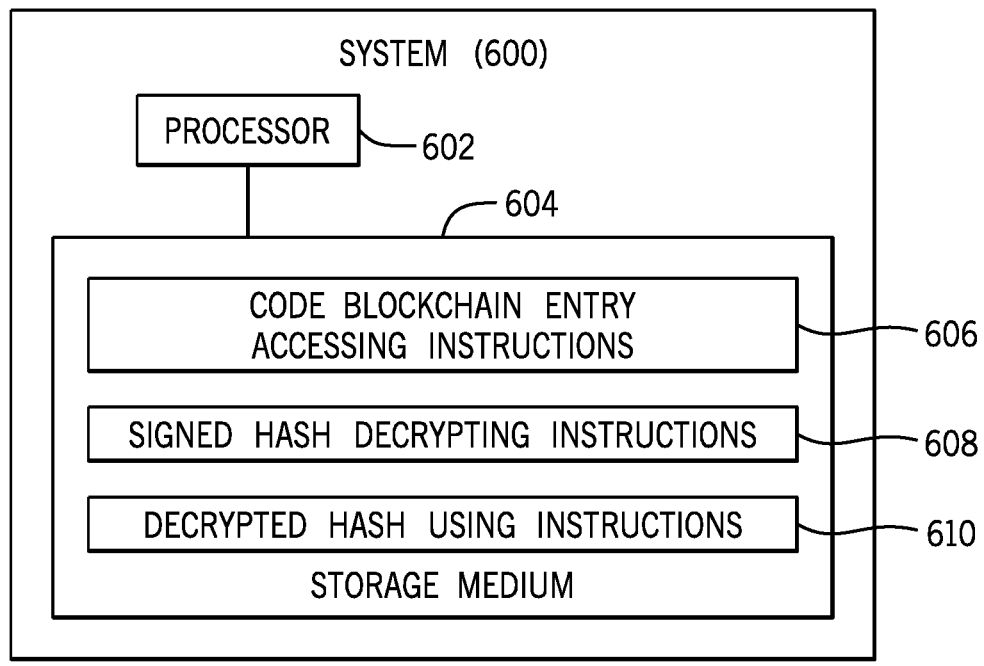
FIG. 6 is a block diagram of a system according to some examples.

FIG. 6 is a block diagram of a system 600, which is an example of the consumer system 112 of FIG. 1. The system 600 includes a processor 602 (or multiple processors). A processor can include a microprocessor, a core of a multi-core microprocessor, a microcontroller, a programmable integrated circuit, a programmable gate array, or another hardware processing circuit.

The system 600 further includes a non-transitory storage medium 604 storing machine-readable instructions for validating a program comprising a plurality of program components of a program. The machine-readable instructions are executable on the processor 602 to perform various tasks. Machine-readable instructions executable on a processor can refer to the instructions executable on a single processor or the instructions executable on multiple processors.

The machine-readable instructions include code blockchain entry accessing instructions 606 to access a code blockchain entry of a blockchain, the code blockchain entry corresponding to a first program component of the plurality of program components. The machine-readable instructions further include signed hash decrypting instructions 608 to decrypt a signed hash included in the code blockchain entry to produce a decrypted hash, the signed hash generated by encrypting a hash produced based on the first program component.

The machine-readable instructions further include decrypted hash using instructions 610 to use the decrypted hash to determine that the first program component has not been tampered with.

Figure 7:
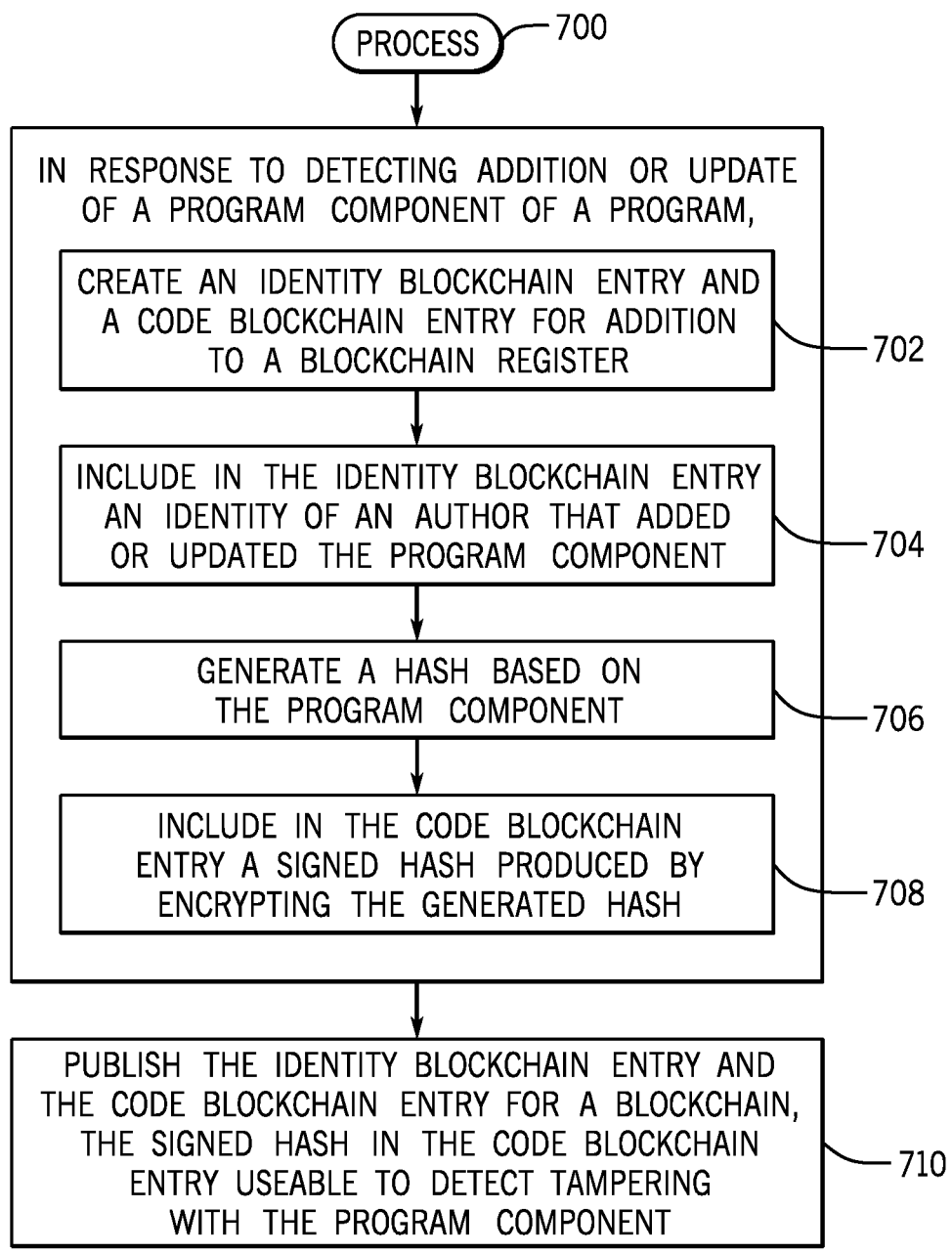
FIG. 7 is a flow diagram of a process according to further examples.

FIG. 7 is a flow diagram of a process 700 according to further examples. The process 700 includes, in response to detecting addition or update of a program component of a program, creating (at 702) an identity blockchain entry and a code blockchain entry for addition to a blockchain register, including (at 704) in the identity blockchain entry an identity of an author that added or updated the program component, generating (at 706) a hash based on the program component and the author's identity including their public key, and including (at 708) in the code blockchain entry a signed hash as signed using the private key.

The process 700 further publishes (at 710) the identity blockchain entry and the code blockchain entry for a blockchain, the signed hash in the code blockchain entry useable to detecting tampering with the program component.

The storage medium 500 (FIG. 5) or 604 (FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions for blockchain-based program change tracking, the instructions upon execution causing a system to:
   in response to detecting a creation of a program component of a program, create a first blockchain entry corresponding to the creation of the program component for addition to a blockchain register, wherein the blockchain register maintains a history of changes made to the program, and wherein the first blockchain entry includes: an action value indicating the creation of the program component, and a name of an author that created and endorsed the program component;
   in response to detecting a deletion of the program component from the program, create a second blockchain entry corresponding to the deletion of the program component for addition to the blockchain register, wherein the second blockchain entry includes: an action value indicating the deletion of the program component, and a name of an entity that performed the deletion of the program component;
   store the second blockchain entry corresponding to the deletion of the program component in the blockchain register;
   determine whether the program component is to be published;
   in response to a determination that the program component is to be published, cause the program component to be published; and
   in response to a determination that the program component is not to be published, send the program component to a new entity for review and endorsement.

2. The non-transitory machine-readable storage medium of claim 1, wherein the instructions further cause the system to:
   generate a hash value based on a portion of the program component,
   encrypt the hash value with a private key of the author, and
   add the encrypted hash value as a signed hash into the first blockchain entry.

3. The non-transitory machine-readable storage medium of claim 2, wherein the instructions upon execution cause the system to:
   include, in the first blockchain entry, information of a public key corresponding to the private key of the author, the public key useable to decrypt the signed hash to validate the program component.

4. The non-transitory machine-readable storage medium of claim 1, wherein the instructions upon execution cause the system to:
   in response to detecting an update of the program component of the program, create a third blockchain entry corresponding to the update of the program component, wherein the third blockchain entry includes a name of an entity that performed the update of the program component.

5. The non-transitory machine-readable storage medium of claim 4, wherein the instructions upon execution cause the system to:
store the third blockchain entry corresponding to the update of the program component in the blockchain register.

6. The non-transitory machine-readable storage medium of claim 1, wherein the instructions upon execution cause the system to:
include, in the first blockchain entry, information of a storage location of the program component.

7. The non-transitory machine-readable storage medium of claim 1, wherein the instructions upon execution cause the system to:
in response to detecting an addition of a further program component of the program:
create a third blockchain entry corresponding to the addition of the further program component,
generate a further hash based on a portion of the further program component,
generate a signed hash by encrypting the further hash with a private key of an entity that added the further program component,
add the signed hash in the third blockchain entry, wherein the signed hash in the third blockchain entry is useable to validate the further program component,
store the third blockchain entry in the blockchain register, and
publish the third blockchain entry.

8. The non-transitory machine-readable storage medium of claim 1, wherein the instructions upon execution cause the system to:
in response to a review and endorsement of the program component by the new entity, add an identity of the new entity and an endorsement signature of the new entity in the first blockchain entry, wherein the endorsement signature is produced by encrypting a hash value with a private key of the new entity.

9. A system comprising:
a processor; and
a non-transitory storage medium storing instructions that are executable by the processor to:
in response to detecting a creation of a program component of a program, create a first blockchain entry corresponding to the creation of the program component for addition to a blockchain register, wherein the blockchain register maintains a history of changes made to the program, and wherein the first blockchain entry includes: an action value indicating the creation of the program component, and a name of an author that created and endorsed the program component,
in response to detecting a deletion of the program component from the program, create a second blockchain entry corresponding to the deletion of the program component for addition to the blockchain register, wherein the second blockchain entry includes: an action value indicating the deletion of the program component, and a name of an entity that performed the deletion of the program component,
store the second blockchain entry corresponding to the deletion of the program component in the blockchain register,
determine whether the program component is to be published,
in response to a determination that the program component is to be published, cause the program component to be published, and
in response to a determination that the program component is not to be published, send the program component to a new entity for review and endorsement.

10. The system of claim 9, wherein the instructions are executable by the processor to:
confirm authenticity of the program component by validating the first blockchain entry.

11. The system of claim 9, wherein the instructions are executable by the processor to:
determine a quality of the program component by identifying the name of the author in the first blockchain entry.

12. The system of claim 11, wherein the instructions are executable by the processor to:
determine the quality of the program component further based on a reputation statement of the author included in the first blockchain entry.

13. The system of claim 9, wherein the instructions are executable by the processor to:
after the program component has been reviewed and endorsed by the new entity, add an endorsement signature of the new entity in the first blockchain entry, and
cause the program component to be published.

14. A method performed by a system comprising a hardware processor for blockchain-based program change tracking, comprising:
in response to detecting a creation of a program component of a program, creating a first blockchain entry corresponding to the creation of the program component for addition to a blockchain register, wherein the blockchain register maintains a history of changes made to the program, and wherein the first blockchain entry includes: an action value indicating the creation of the program component, and a name of an author that created and endorsed the program component;
in response to detecting a deletion of the program component from the program, creating a second blockchain entry corresponding to the deletion of the program component for addition to the blockchain register, wherein the second blockchain entry includes: an action value indicating the deletion of the program component, and a name of an entity that performed the deletion of the program component; and
storing the second blockchain entry corresponding to the deletion of the program component in the blockchain register;
determining whether the program component is to be published;
in response to a determination that the program component is to be published, causing the program component to be published; and
in response to a determination that the program component is not to be published, sending the program component to a new entity for review and endorsement.

15. The method of claim 14, further comprising:
generating a hash value based on a portion of the program component;
encrypting the hash value with a private key of the author of the program component;

add the encrypted hash value as a signed hash in the first blockchain entry; and detecting tampering with the program component using a decrypted hash generated by decrypting the signed hash in the first blockchain entry.

16. The method of claim 15, further comprising:

adding, in the first blockchain entry, a public key corresponding to the private key of the author, wherein the public key is useable to decrypt the signed hash to validate the program component.

17. The method of claim 14, further comprising:

after the program component has been reviewed and endorsed by the new entity, adding an endorsement signature of the new entity in the first blockchain entry, and causing the program component to be published.

18. The method of claim 14, further comprising:

providing a notification of availability of the program component.

19. The method of claim 14, further comprising:

in response to detecting an update of the program component of the program, create a third blockchain entry corresponding to the update of the program component; and store the third blockchain entry in the blockchain register.

* * * * *